J. THOMPSON.
Face-Testers for Mill-Stones.

No. 156,684. Patented Nov. 10, 1874.

WITNESSES.
W. Herndon Moxon
Harry Polemon

INVENTOR.
John Thompson
per Attys
A. H. Evans & Co.

UNITED STATES PATENT OFFICE.

JOHN THOMPSON, OF CRESTLINE, OHIO, ASSIGNOR OF ONE-HALF HIS RIGHT TO TRUMAN DAILY, OF SAME PLACE.

IMPROVEMENT IN FACE-TESTERS FOR MILLSTONES.

Specification forming part of Letters Patent No. 156,684, dated November 10, 1874; application filed October 20, 1874.

*To all whom it may concern:*

Be it known that I, JOHN THOMPSON, of Crestline, Ohio, have invented a new and useful Improvement in Face-Testers for Millstones, of which the following is a clear, full, and exact description, reference being had to the accompanying drawings, making a part of this specification, in which—

Figure 1:
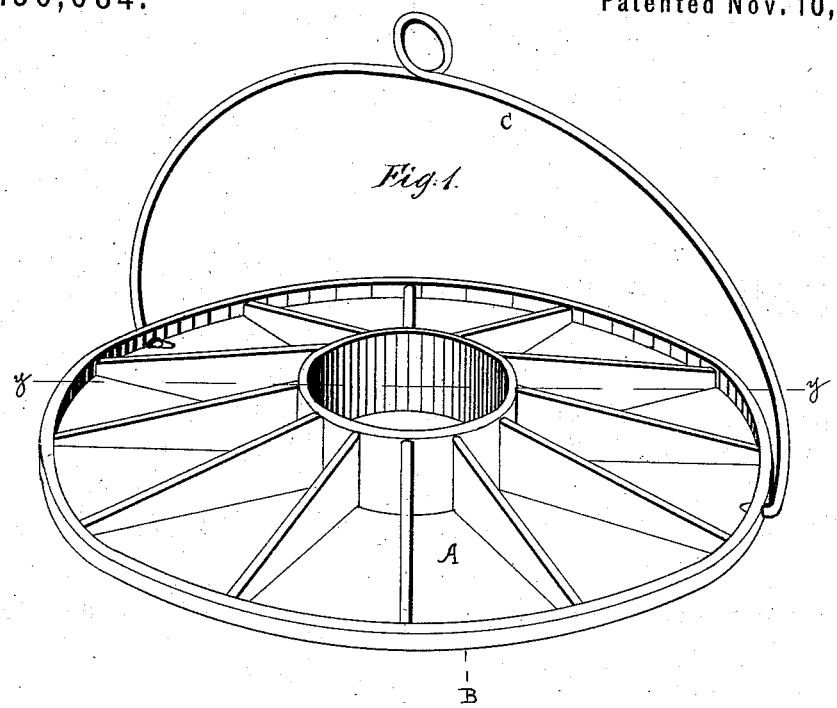
Figure 2:
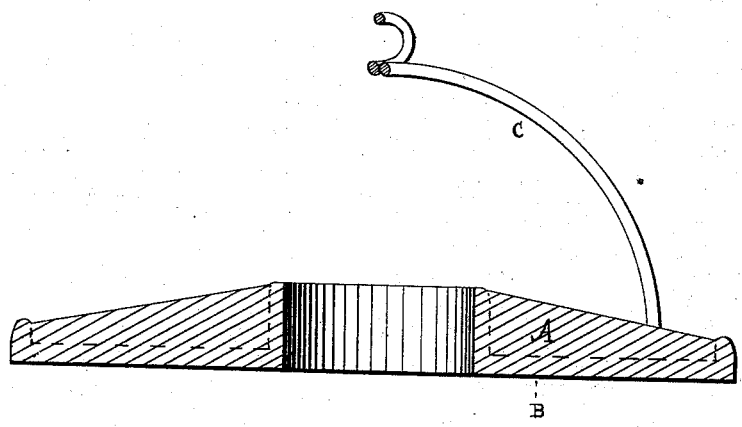

Figure 1 is a perspective view of my invention, and Fig. 2 is a section on the line *y y*.

My invention relates to a new and useful substitute for the "staff" which is now used for marking the faces of millstones in order that they may be dressed and brought to a proper surface; and it consists in a circular metallic plate faced off in a lathe to a perfect surface, such as is desired on the millstone. The plate is made of the same diameter as the stone, or nearly so, and, when coated with paint and brought in contact with the face of the stone, will indicate the parts to be picked or dressed off at an operation. It is evident that, with this tester brought to a perfect surface on a lathe, any dresser can secure a perfect surface on the stone, however unskillful he may be with the ordinary staff.

In the accompanying drawings, A represents a circular plate of metal near the same diameter of the stone to be faced. This plate has a hole in the center, so that it may be fitted on the spindle which passes through the center of the bed-stone, when the bed-stone is to be dressed, or fitted on a journal in the eye of the runner when the latter is to be faced or dressed. B is the face of the plate, brought to a perfect surface by means of a lathe. C is a handle by which to move the plate as desired.

Any convenient means may be adopted for operating the plate.

Having thus described my invention, what I claim as new, and desire to secure by Letters Patent, is—

A face-tester for millstones, composed of a metal plate covering the entire surface of the stone, substantially as and for the purpose above set forth.

JOHN THOMPSON.

Witnesses:
  A. M. PATTERSON,
  J. W. KIMMELL.